T. G. RAKESTRAW.
STEAM TRAP.
APPLICATION FILED AUG. 18, 1916.

1,252,720.

Patented Jan. 8, 1918.
2 SHEETS—SHEET 1.

WITNESSES:
L. S. Woodhull
Nora Hurley

INVENTOR
Thomas G. Rakestraw
BY
S. E. Thomas
ATTORNEY

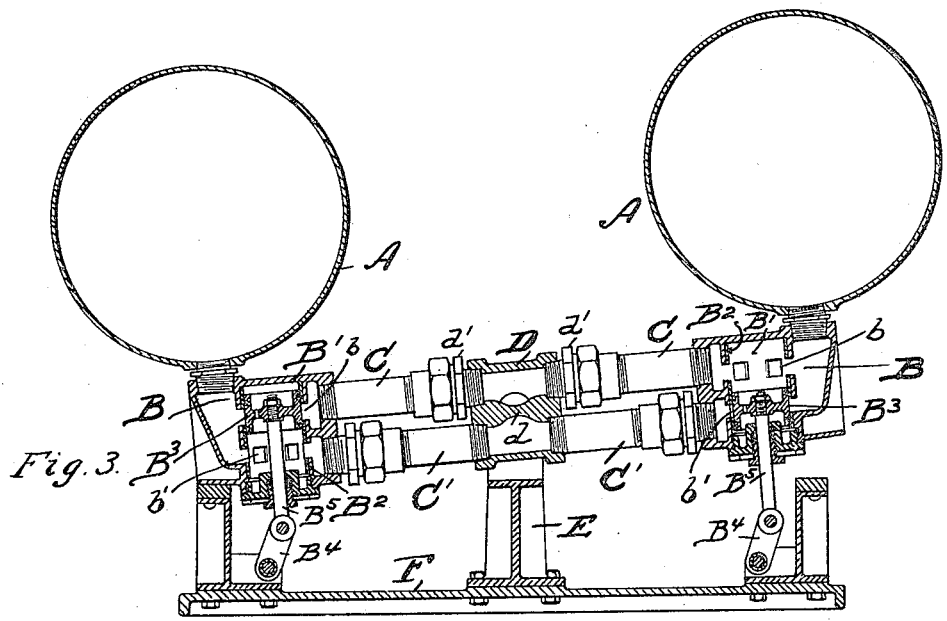

UNITED STATES PATENT OFFICE.

THOMAS G. RAKESTRAW, OF DETROIT, MICHIGAN.

STEAM-TRAP.

1,252,720.     Specification of Letters Patent.     Patented Jan. 8, 1918.

Application filed August 18, 1916. Serial No. 115,705.

*To all whom it may concern:*

Be it known that I, THOMAS G. RAKESTRAW, citizen of the United States, residing at Detroit, county of Wayne, State of Michigan, have invented a certain new and useful Improvement in Steam-Traps, and declare the following to be a full, clear, and exact description of the same, such as will enable others skilled in the art to which it pertains to make and use the same, reference being had to the accompanying drawings, which form a part of this specification.

My invention relates to steam traps, as shown in the accompanying drawings and more particularly described in the following specification and claims.

The object of this invention is to simplify the general construction and operation of this type of apparatus, the present invention being especially designed as an improvement over that shown and described in my patent dated the ninth day of January, 1917, No. 1,211,753, many of the parts therein being eliminated, whereby the cost of manufacture is materially reduced.

Other advantages and improvements will hereafter appear.

In the drawings accompanying this specification,

Fig. 3, is a cross-sectional view through the water inlet pipes, on line 3—3 of Fig. 1.

Fig. 4, is a similar cross-sectional view through the steam inlet pipes, see line 4—4 of Fig. 1.

Figure 1:
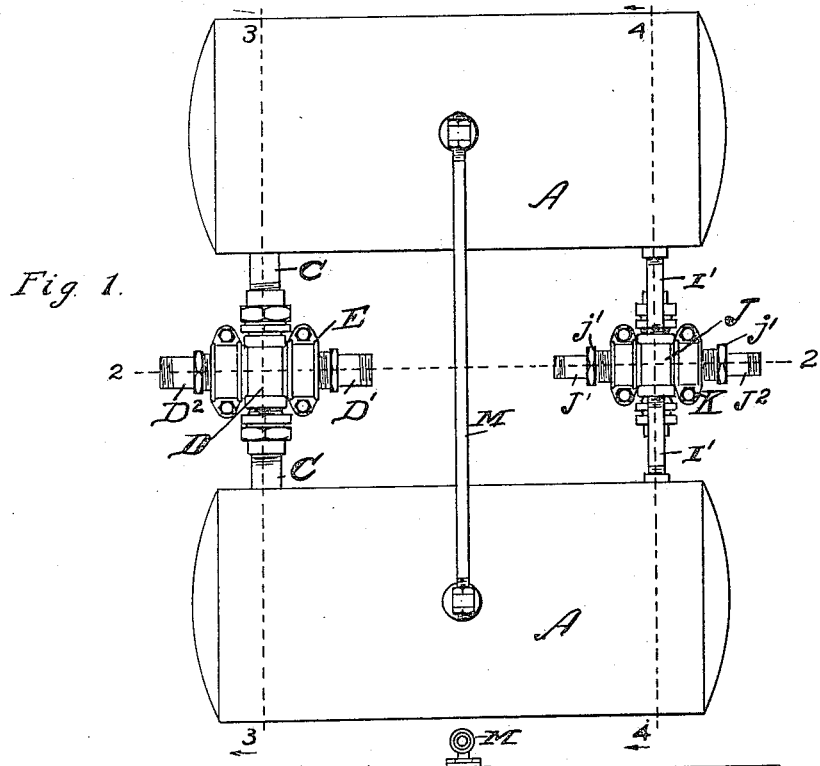
Figure 1, is a plan view of the device.
Figure 2:
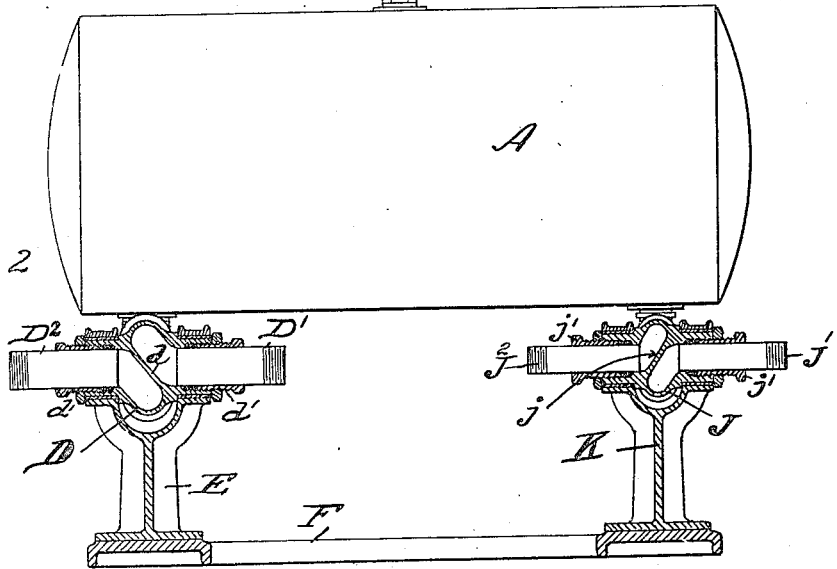
Fig. 2, is a longitudinal central section through the apparatus on line 2—2 of Fig. 1.

Referring now to the letters of reference placed upon the drawings:—

A, A, denotes a pair of tilting tanks spaced apart, each having at one end a water-valve fitting B, respectively connected by superimposed pipes C, C', with an oscillating fitting D, journaled in a standard E, bolted to a base plate F.

H, is a steam valve fitting, similar in construction to the water-valve fitting, but relatively smaller, connected with each tank at its opposite end, and by superimposed pipes I, I', with an oscillating fitting J, journaled in a standard K, in turn bolted to the base plate.

The fitting B, is chambered to provide a cylinder B', fitted with a brass lining $B^2$, in which reciprocates a piston-valve $B^3$. $b, b$, and $b', b'$, are respectively inlet and outlet ports in the brass lining and cylinder to establish connection between the tanks and the inlet and outlet pipes C, C', and oscillating fitting D, which is in turn provided with pipes D', $D^2$, (on which the fitting is free to turn) adapted for connection with a heating system, and a boiler,—not shown. $d'$, are gland nuts to insure a tight connection between the pipes D', $D^2$ and the fitting D. $d$, is a partition in the fitting D, forming passages through the fitting with which the inlet pipes C, C, and D', and the outlet pipes C', C', and discharge pipe $D^2$ are respectively connected. $B^4$ is a swinging link connection between the rod $B^5$, of the piston $B^3$, and the base plate.

The fitting H, is chambered to provide a cylinder H', having a brass lining $H^2$, in which reciprocates a steam piston-valve $H^3$. $h, h$, and $h', h'$ are respectively inlet and outlet ports in the brass lining and cylinder to establish connection between the tanks and the steam inlet and exhaust pipes I, I' connected with the oscillating fitting J. $j$, is a partition dividing the fitting J, to separate the inlet and exhaust passages through the same.

J', $J^2$ are steam inlet and exhaust pipes, (on which the fitting J, is free to rock) adapted for connection with a boiler and exhaust. $j'$ are gland nuts to insure tight connection between the pipes J', $J^2$ and the fitting J.

$H^4$, is a swinging link connection between the rod $H^5$, of the piston-valve $H^3$, and the base plate.

L, denotes an abutment secured to the base plate at each end, provided with a resilient pad L', to receive the impact of the tanks upon tilting.

M, is a tie rod engaged with each tank to secure them together at the top to insure greater rigidity.

Having indicated the several parts by reference letters the construction and operation of the device will be readily understood.

As well understood in installing apparatus of this character, the trap is located at a suitable altitude above the boiler so that upon admission of boiler pressure to the trap the water therein contained is free to pass from the trap to the boiler by gravity. A suitable pipe connection with check-valve (not shown) is provided between the return pipes from the heating system and the pipe D', and between the pipe D², and the boiler. A similar pipe connection (not shown) is also provided between the steam space of the boiler and the steam inlet pipe leading to the trap and also from the exhaust pipe leading from the trap to the point of discharge. These several connections are common to traps of this type and need not be here particularly described as they are well understood by all familiar with such installations.

The several connections being properly installed, condensation from the heating coils is permitted to enter one of the tanks of the trap, which upon filling to an extent sufficient to overcome the weight of the other tank, causes the apparatus to rock on the standards E and K, thereby actuating the piston-valves B³ and H³, due to their respective flexible link connections with the base plate. Steam boiler pressure is thus admitted to the tank,—depressed by the weight of the water entering the latter,— while simultaneously therewith the piston-valve B³ at the opposite end of the tank is opened, permitting the water in the tank to pass by gravity to the boiler. While the water is thus being discharged from the tank referred to, condensation from the heating system is admitted to the other tank in the manner previously described until its weight overcomes the weight of the first named tank, whereupon the apparatus tilts in the opposite direction, admitting boiler pressure to the last named tank that the water contained within may pass to the boiler,—the valves of the first named tank being shifted to respectively release the tank of any boiler pressure therein through the exhaust pipe J², in order that condensation may again enter the tank;—the operation described being then repeated. It will be seen that by superimposing the water inlet and discharge pipes, and the steam inlet and exhaust pipes, and coupling them to valve fittings having a reciprocating piston-valve adapted to control both the inlet and discharge of the respective tanks, as indicated, I am enabled to simplify the construction, and to reduce the cost of manufacture over that disclosed in the patent referred to in the opening paragraphs of this specification.

Having thus described my invention, what I claim is:—

1. In an apparatus of the character described, a pair of tilting tanks, oscillatable pipe fittings suitably journaled, superimposed pipes connecting the tanks with the fittings, and piston valves respectively controlling the delivery through each pair of superimposed pipes adapted to be operated by the oscillatory movement of the tanks, whereby the exhaust of one tank is released that feed water or condensation may enter the tank simultaneously with the admission of steam or boiler pressure to the other tank, that the water contained in the latter may pass to the boiler.

2. In an apparatus of the character described, a pair of tilting tanks, oscillatable pipe fittings suitably journaled, superimposed pipes leading from the fittings to the respective tanks, a pair of piston valves for each tank actuated through the tilting action of the tanks, said valves being respectively adapted to control admission and delivery through a pair of the superimposed pipes, whereby upon alternate tilting of the tanks the exhaust of one tank is released that water may enter said tank, simultaneously with the admission of steam to the other tank and the discharge of water therefrom.

3. In an apparatus of the character described, a base plate, a pair of tilting tanks, oscillatable pipe fittings suitably journaled and provided with a partition to form respectively an inlet and a return passage, a plurality of superimposed pipes respectively connected with the inlet and return passage of the pipe fittings, a pair of piston valves carried by each tank to control the admission and delivery through the superimposed pipes, means connecting the piston of each valve with the base plate, whereby upon the tilting of the tanks said valves will be actuated to admit and discharge water and steam pressure to and from the tanks upon the alternate tilting of the latter.

4. In an apparatus of the character described, a base plate, a pair of tilting tanks, oscillatable pipe fittings suitably journaled and provided with a partition to form respectively an inlet and a return passage, a pair of superimposed pipes respectively connecting the inlet and return of each pipe fitting with the tanks, means upon which the fitting is adapted to flex for connecting the fittings with a boiler and also with the returns from a heating system, piston valves carried by each tank to control admission and delivery through the respective superimposed pipes, and means connecting the pistons of each valve with the base plate.

In testimony whereof I sign this specification in the presence of two witnesses.

THOMAS G. RAKESTRAW.

Witnesses:
S. E. THOMAS,
NORA HURLEY.

Copies of this patent may be obtained for five cents each, by addressing the "Commissioner of Patents, Washington, D. C."